Figure 1:
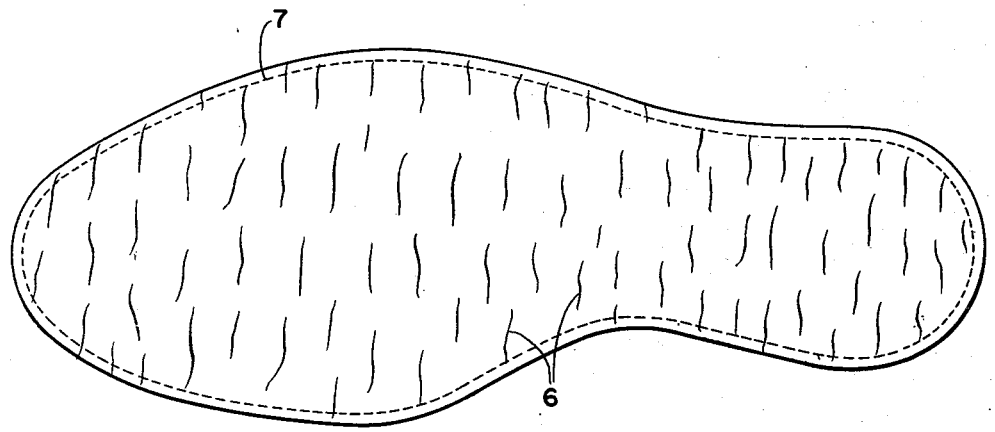

Feb. 11, 1958 T. K. SEIBERLING 2,822,627
BLOWN FIBER-CONTAINING SHOE SOLE AND METHOD OF MAKING SAME
Filed May 23, 1955

*INVENTOR.*
THEOPHILUS K. SEIBERLING
BY Jordan C. Mack
ATTORNEY

United States Patent Office 2,822,627
Patented Feb. 11, 1958

2,822,627
BLOWN FIBER-CONTAINING SHOE SOLE AND METHOD OF MAKING SAME

Theophilus K. Seiberling, Akron, Ohio, assignor to Seiberling Rubber Company, Barberton, Ohio, a corporation of Delaware Application May 23, 1955, Serial No. 510,348

5 Claims. (Cl. 36—32)

This invention relates to blown fiber-containing shoe soles. The soles are blown just sufficiently to reduce their gravity to about that of water, and preferably slightly less than that of water. They may be considerably lighter than water. The soles are designed particularly for use on workingmen's shoes, but may be used on other shoes.

There are several things required in a shoe sole. It must have good wear; it must be light in weight; it must be flexible; it must have non-slip properties (a high coefficient of friction); and, to make it most acceptable to the trade, it must have such a consistency that it can be stitched on to a shoe.

The sole of this invention possesses all of these desirable properties. In addition, it may be made of substantial thickness without becoming too heavy, and this is desirable for several reasons. It lifts the workman up out of any water, etc. on the floor or ground, and assists in absorbing shocks produced by stepping on a stone or other irregular object. The fibers and air cells in the sole also assist in spreading and absorbing shocks. The air cells also insulate the wearer from the heat and cold of the surfaces on which he stands or walks. A further function of the air cells is to reduce the gravity of the sole and make it possible to have the sole of the desired thickness, without its being too heavy.

The blown sole made from a rubber composition which does not contain fiber is not adapted for stitching to the upper portion of a shoe (ordinarily through a welt), unless the sole is made very stiff. The soft sole of this invention is made stitchable by the fibers which prevent the threads used in stitching from cutting through the rubber composition or unduly depressing the rubber composition. For instance, if there are no cords or fibers in the sole, the threads tend by depressing the sole near the point of the toe to turn the point downwardly so that it scuffs easily. The edge of the sole is distorted causing an unsightly appearance and accelerating wear. The fiber content may, for example, be as low as 5 percent by weight but will ordinarily be in the range of 15 to 20 percent, and may be as much as 30 or even 40 percent or more. The amount of rubber may be just sufficient to hold the fibers together.

The preferred fiber source is what is known as "cord friction." This is the scrap accumulated during the construction of tires from cord fabric. The cord fabric has a thin coating of uncured rubber compound frictioned on to it as a calender or the like. The cords are twisted fiber bundles composed of cotton or of rayon (including nylon, etc.) monofilaments, etc. This scrap varies widely in composition not only with respect to the character of the fibers and also the size and spacing of the cords, but also with respect to the composition of the rubber compound. Different rubber compounds are used for passenger tires, truck tires, etc. They include both natural and synthetic rubbers. Not only are the rubber compositions different, but different amounts of rubber compound are put on the different fabric plies used in the different types and kinds of tires. Friction scrap from one source used in the development of this invention had an average cord content of between 30 and 40 percent, but other scrap will contain a higher or lower cord content.

Although large amounts of cord fabric are employed in the manufacture of tires, some square woven fabric is used. Friction scrap which contains such fabric may be employed. Other rubber operations produce scraps containing other fibers, such as the scrap from the manufacture of overshoes, hose, etc. For the purposes of this invention, friction scrap which contains cord fibers is preferred because cord fibers do not disintegrate during the milling operation to the degree that others do. Although it is economical to use scrap fabric coated with rubber, it is possible to form the blown soles of this invention from rubber stock to which fresh (unfrictioned) fibers are added. Fresh fibers and scrap fibers may be mixed in the stock used in carrying out this invention.

There are several ways to soften shoe soles. Plasticizers may be added to the rubber stock. They act as diluents of the rubber compound. Rubber which contains too much plasticizer does not wear as well as rubber which contains less plasticizer. Instead of using plasticizers, or in addition to the use of a small amount of plasticizer, softness may be imparted by incorporating air (or other gas) in the rubber stock. It is possible to whip air into a latex of rubber or other elastomer, but the preferred procedure for producing the gas-containing soles of this invention is to incorporate a gas-forming substance in the rubber composition prior to vulcanization, and then liberate the gas during the vulcanization. Various gas-forming compositions are available on the market for this purpose. Rubber products prepared in this manner are generally known as "blown products" as distinguished from the foamed products in which air is whipped into a latex of the rubber or other elastomer.

Too much air in the stock makes it tender, and subject to scuffing, particularly at the toes and heels. However, a small amount of air uniformly distributed throughout the stock in small cells, does not materially adversely affect the stock from the standpoint of scuffing. It makes the stock lighter in weight and gives a cushioning effect and insulation which are very desirable.

In the blown stock of this invention the gas-forming ingredient is uniformly distributed throughout the stock and the cells formed are each complete in themselves and distinct from the other cells. This unicellular structure is desirable or necessary in a sole to prevent the transmission of water, etc. through the sole. The gas content of the stock may vary, but in general will range from a minimum of perhaps 2 or 3 percent up to a maximum of not over 10 or 15 or possibly 20 percent. However, the gas content will depend upon the gravity desired and this will depend upon the percentage of heavy compounding ingredients in the rubber, the amount of fibers, etc. The sole may have a gravity greater than that of water. The gravity may not be substantially greater than that of water.

The sole must be flexible to be comfortable. Fibers tend to stiffen a sole. By calendering a rubber stock which contains fibers, the fibers are aligned in the general direction in which the stock is passed through the calender. The stock used in the blown soles of this invention is preferably cut from the calendered stock in such a way that the aligned fibers lie generally across the finished sole. This gives flexibility in the lengthwise direction of the sole. This alignment of the fibers also gives traction to the sole, because as the sole wears and the fibers become exposed and then removed from the sole, the resulting cavities lie generally across the sole, giving traction against slippage in the forward and backward directions.

The invention is illustrated in the drawings, in which—

Fig. 1 is a bottom view of a sole stitched to a shoe; and

Figure 2:
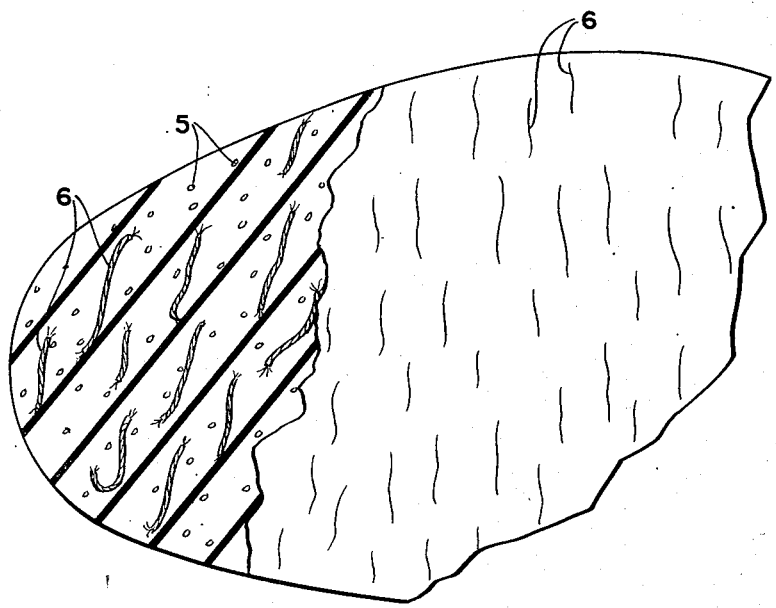

Fig. 2 is an enlarged view of the same sole before being stitched to the shoe, with a part of the sole broken away to show the air cells 5 as well as the cords 6. The stitching is identified by the numeral 7.

In determining the hardness of fiber-containing soles with a durometer, if the durometer needle is placed above a fiber a higher reading is obtained than if the needle is located between fibers—that is, away from fibers adjacent the surface of the stock. Thus, the durometer readings give a maximum and minimum hardness which may have a spread of as much as 30 points in Shore A hardness. The hardness of the stock of this invention will preferably have a minimum of 40 and a maximum of 80 Shore A hardness, or thereabout, but will preferably range from about 55 to 65.

It is difficult to work rubber compositions which contain long fibers. The friction stock of this invention is preferably treated by taking a mat of the scrap pieces and running it through a cracker mill (with corrugated rolls) and then running it through a chopper with parallel blades set no more than about 1 to 1½ inches apart. The resulting fibers are of varying length, but generally not over about 2 inches. Long fibers lying between the knives may be several inches long, and an additional knifing or cracking may be desirable to cut these to short lengths. However, the knifed stock may be added directly to a rubber mill, and if other compounds are to be added they may be compounded with the cracked stock on this mill. Alternatively, the knifed stock may first be sheeted by being run a second time through a cracker to produce a sheet which is readily handled and stored. Eventually it will be delivered to the mill for compounding with vulcanizing ingredients and such other rubber, fiber, etc., if any, as it is found desirable to add. The friction stock varies a good deal in composition, and test vulcanizations on the various mixes are necessary to maintain uniformity of the finished product.

The color of the sole stock is important from a commercial standpoint. The scrap may vary a good deal in color. Generally the color of the sole should be lighter than the friction scrap, which is black. The following formula refers to brown soles in which iron oxide has been added to the friction scrap to give the desired color. Other pigments may be employed to produce soles of other colors.

The sole may be made directly from the friction scrap without adding any rubber or other plastic to it. The vulcanizing ingredients are present in the scrap so that it is only necessary to add a blowing agent. This will give a sole compound of relatively high fiber content, which is the color of the friction scrap.

In order to produce a sole of a different color it is desirable to incorporate pigment in additional rubber compound which contains no fabric, and then mix this pigmented composition with the cut friction scrap on a rubber mill in any desired proportion. The blowing agent may be compounded with this material before it is added to the scrap or in the operation in which it is blended with the scrap. Any required additional compounding ingredients will be added. It is important that the temperature of the stock containing the blowing agent is not raised sufficiently to release gas from it prematurely.

The following formula is illustrative:

| | Parts |
|---|---|
| Natural rubber | 65 |
| Synthetic rubber | 35 |
| Zinc oxide | 5 |
| Stearic acid | 3 |
| Flex-cracking antioxidant | 1 |
| Retarder | 1 |
| Iron oxide | 10 |
| Reinforcing pigment | 40 |
| Plasticizer | 5 |
| Accelerator | 2 |
| Sulfur | 2.65 |
| Blowing agent | 4 |
| Chopped friction scrap | 169 |

The synthetic rubber in the foregoing formula is low-temperature GR–S. The function of the retarder is to prevent pre-vulcanization. The reinforcing pigment is a hydrated silicon oxide known as Hi-Sil (manufactured by Columbia-Southern Chemical Corporation). The plasticizer may be mineral oil, an ester, or aromatic material such as a coumarone-indene resin, etc.

The foregoing formula is illustrative and is subject to modification as will be readily appreciated by the man skilled in the art.

The compound is prepared on a rubber-compounding mill or in a Banbury or other suitable equipment. The compounded material is then sheeted out on a calender or the like. In sheeting out the compound the fibers are to a considerable extent aligned in the direction in which the sheet passes through the mill. This compounded sheet is then cut into rectangular slugs with the long dimension of the slug perpendicular to the direction of the calender, so that when the slug is placed lengthwise in the molding cavity for a sole, the fibers will be generally aligned across the sole. This makes the sole more flexible in the lengthwise direction than crosswise.

The compound contains sufficient blowing agent to produce a relatively light sponge if the sponge rubber is prepared in an unconfined space or in a large cavity. To produce the desired blown sole a slug is used which contains just less than enough of the rubber compound to completely fill the cavity in the unblown, unvulcanized condition. The amount the stock is blown determines the final gravity of the sole, and, of course, the gravity is also dependent upon the proportion of heavier and lighter ingredients within the stock.

For the manufacture of a sole ½ inch thick, a slug about ¾ inch thick is quite satisfactory. The slug is at room temperature when put into the molding cavity, and the cavity is at the vulcanization temperature. The rubber stock quickly softens, and as the mold is closed the slug is flattened out and tends to fill the cavity, although the cavity is not completely filled until gas has been released from the blowing agent. The release of the gas starts at a temperature of about 250 to 280° F., depending upon the blowing agent employed. As the gas is released the rubber composition completely fills the mold and becomes unicellular.

If the sole is removed from the mold before the vulcanization is complete, the contained gas will cause the sole to expand to a very appreciable extent. To prevent such expansion the rubber is completely cured within the mold. The cure required depends upon the accelerator, etc. employed in the rubber compound. Generally the rubber will be cured at around 300 to 330°, and may take from 5 to 15 minutes, as is well known to the man skilled in the art. Different rubber men will prefer different accelerators, etc., and different cures will be utilized.

The completely cured stock expands somewhat when removed from the mold and then on cooling shrinks a certain amount, due to the decrease in the volume of the air entrapped in the cells within the sole. By completing the cure before removing the sole from the mold the ultimate expansion is reduced to not more than about 1 or 2 percent. To illustrate, we refer to a specific example in which there is reference to irons, a term employed to measure the thickness of leather; one iron being 1/48 inch. Specifically, a mold designed to produce an unblown sole of 21 irons thick will produce a blown sole of the foregoing composition that is 24 irons thick. On removal from the mold the cured sole expands in all three dimensions. The fibers which are generally crosswise of the sole inhibit lateral expansion so that the greatest expansion occurs lengthwise and also vertically. The percentages of longitudinal and vertical expansion are probably approximately equal. The immediate expansion is followed by contraction on cooling. The overall expansion is a measure of the amount of air entrapped within the cells.

The ordinary sponge sole is cemented to the shoe upper. The fibers in the blown sole of this invention prevent the thread used in stitching from cutting or sinking excessively into the rubber and this sole is therefore eminently adapted for sewing to the upper.

Although the description refers more particularly to the use of cords and other fibers—other flexible, elongated, individually distinct elements may be employed. They are closely distributed within the unicellular rubber in order to accomplish the results described.

What I claim is:

1. A unicellular rubber shoe sole which contains flexible, elongated, individually distinct elements of a length up to not substantially over 1½ inches, said elements being closely distributed throughout the sole.

2. The sole of claim 1 in which the flexible elements are cords.

3. The sole of claim 1 in which the flexible elements are, in general, aligned across the sole.

4. The method of making a shoe sole which comprises incorporating a blowing agent and flexible, elongated elements in rubber stock and bringing said elements generally into alignment therein, cutting a slug from the stock with the elements crosswise of the slug, putting the slug lengthwise in the cavity of a mold, closing the mold, and then heating the slug and completing the vulcanization of the rubber in the cavity and releasing gas from the blowing agent while maintaining the mold closed, and thereby forming unicellular gas cells in the stock which cause it to completely fill the cavity.

5. The process of claim 4 in which the flexible elements are cords.

References Cited in the file of this patent

UNITED STATES PATENTS

| | | |
|---|---|---|
| 1,137,159 | Meyer | Apr. 27, 1915 |
| 1,249,702 | Wiegand et al. | Dec. 11, 1917 |
| 1,347,775 | Burr et al. | July 27, 1920 |
| 1,457,826 | Egerton | June 5, 1923 |
| 1,884,106 | Moran | Oct. 25, 1932 |
| 1,918,893 | Beckmann | July 18, 1933 |
| 2,168,243 | Rollman | Aug. 1, 1939 |
| 2,374,487 | Jayne | Apr. 24, 1945 |
| 2,382,248 | Mason | Aug. 14, 1945 |
| 2,663,097 | Giese | Dec. 22, 1953 |

OTHER REFERENCES

"Glass Fiber Reinforcement of Foam Rubber," The Rubber Age Synthetic, November 1950, page 330.